US009621849B2

(12) United States Patent
Benzaia et al.

(10) Patent No.: US 9,621,849 B2
(45) Date of Patent: *Apr. 11, 2017

(54) INTERACTIVE TELEVISION SYSTEM WITH AUDIO AND VIDEO CALLING

(71) Applicant: AT&T Intellectual Property I, LP, Atlanta, GA (US)

(72) Inventors: Thomas P. Benzaia, Sugar Land, TX (US); Bernard Ku, Austin, TX (US); Lakshminarashimhan Naidu, Pearland, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/248,404

(22) Filed: Apr. 9, 2014

(65) Prior Publication Data
US 2014/0218460 A1 Aug. 7, 2014

Related U.S. Application Data

(63) Continuation of application No. 12/898,186, filed on Oct. 5, 2010, now Pat. No. 8,730,294.

(51) Int. Cl.
*H04M 3/42* (2006.01)
*H04N 7/14* (2006.01)
*H04L 29/06* (2006.01)

(52) U.S. Cl.
CPC .......... *H04N 7/148* (2013.01); *H04L 65/103* (2013.01); *H04L 65/1026* (2013.01); *H04L 65/1059* (2013.01); *H04L 65/1069* (2013.01); *H04L 65/605* (2013.01); *H04N 7/147* (2013.01)

(58) Field of Classification Search
USPC ......... 348/14.01–14.09, 14.11; 725/106, 110
See application file for complete search history.

(56) References Cited

U.S. PATENT DOCUMENTS

| 7,024,461 | B1* | 4/2006 | Janning | ............. H04L 29/06027 709/207 |
| 8,108,892 | B1 | 1/2012 | Durkee et al. | |
| 8,601,515 | B2 | 12/2013 | Sparrell | |
| 2005/0195802 | A1 | 9/2005 | Klein et al. | |
| 2006/0251236 | A1* | 11/2006 | Peters | ............... H04L 29/06027 379/265.01 |
| 2007/0245384 | A1 | 10/2007 | Walter et al. | |

(Continued)

*Primary Examiner* — Maria El-Zoobi
(74) *Attorney, Agent, or Firm* — Guntin & Gust, PLC; Atanu Das

(57) ABSTRACT

A system that incorporates teachings of the present disclosure may include, for example, a computer-readable storage medium in a media controller having computer instructions to execute a soft-phone client application on the media processor, receive an audio call or a video call originating from an IP Multimedia Subsystem network where the calls are directed to the media processor by a gateway having a switch that routes the audio call or video call in accordance with a destination address included in a Session Initiation Protocol (SIP) header message, and selectively answer one of the audio call or the video call. The computer instructions can be operable to present an audio portion of the audio call through a speaker of a presentation device when an audio call is answered. Other embodiments are disclosed.

20 Claims, 6 Drawing Sheets

(56) References Cited

U.S. PATENT DOCUMENTS

| | | | |
|---|---|---|---|
| 2007/0291736 A1* | 12/2007 | Furlong | H04L 12/2803 370/352 |
| 2008/0069087 A1 | 3/2008 | Igoe | |
| 2008/0134278 A1* | 6/2008 | Al-Karmi | H04L 12/2834 725/141 |
| 2008/0163330 A1 | 7/2008 | Sparrell | |
| 2008/0165283 A1 | 7/2008 | Brandt | |
| 2008/0309753 A1* | 12/2008 | Karnalkar et al. | 348/14.11 |
| 2010/0066805 A1 | 3/2010 | Tucker | |
| 2010/0115568 A1 | 5/2010 | Gupta et al. | |
| 2010/0119049 A1* | 5/2010 | Clark | H04M 3/42153 379/201.01 |
| 2010/0180313 A1 | 7/2010 | Bi | |
| 2012/0169831 A1 | 7/2012 | Nietfeld | |

* cited by examiner

INTERACTIVE TELEVISION SYSTEM WITH AUDIO AND VIDEO CALLING

CROSS-REFERENCE TO RELATED APPLICATION(S)

This application is a continuation of U.S. application Ser. No. 12/898,186 filed Oct. 5, 2010, entitled "Internet Protocol Television Audio and Video Calling," which is incorporated herein by reference in its entirety.

FIELD OF THE DISCLOSURE

The present disclosure relates generally to audio and video calling and more specifically to an Internet Protocol Television (IPTV) audio and video calling system and method.

BACKGROUND

Existing IPTV systems have Voice over IP or VoIP and video conferencing capabilities using computer equipment and specialized VoIP telephones. These functions are not integrated elegantly with a number of other functions associated with IPTV network services such as video presentations. Subscribers receiving calls during the presentation of a media program may be inconvenienced and miss part of the presentation in their attempts to answer a call or even to make a call using the IPTV calling features. Generally, existing subscribers are making and answer phone calls using existing corded or cordless phones that may be coupled via an RJ11 jack to a Terminal Adapter located inside a Residential Gateway.

DETAILED DESCRIPTION

Figure 1:
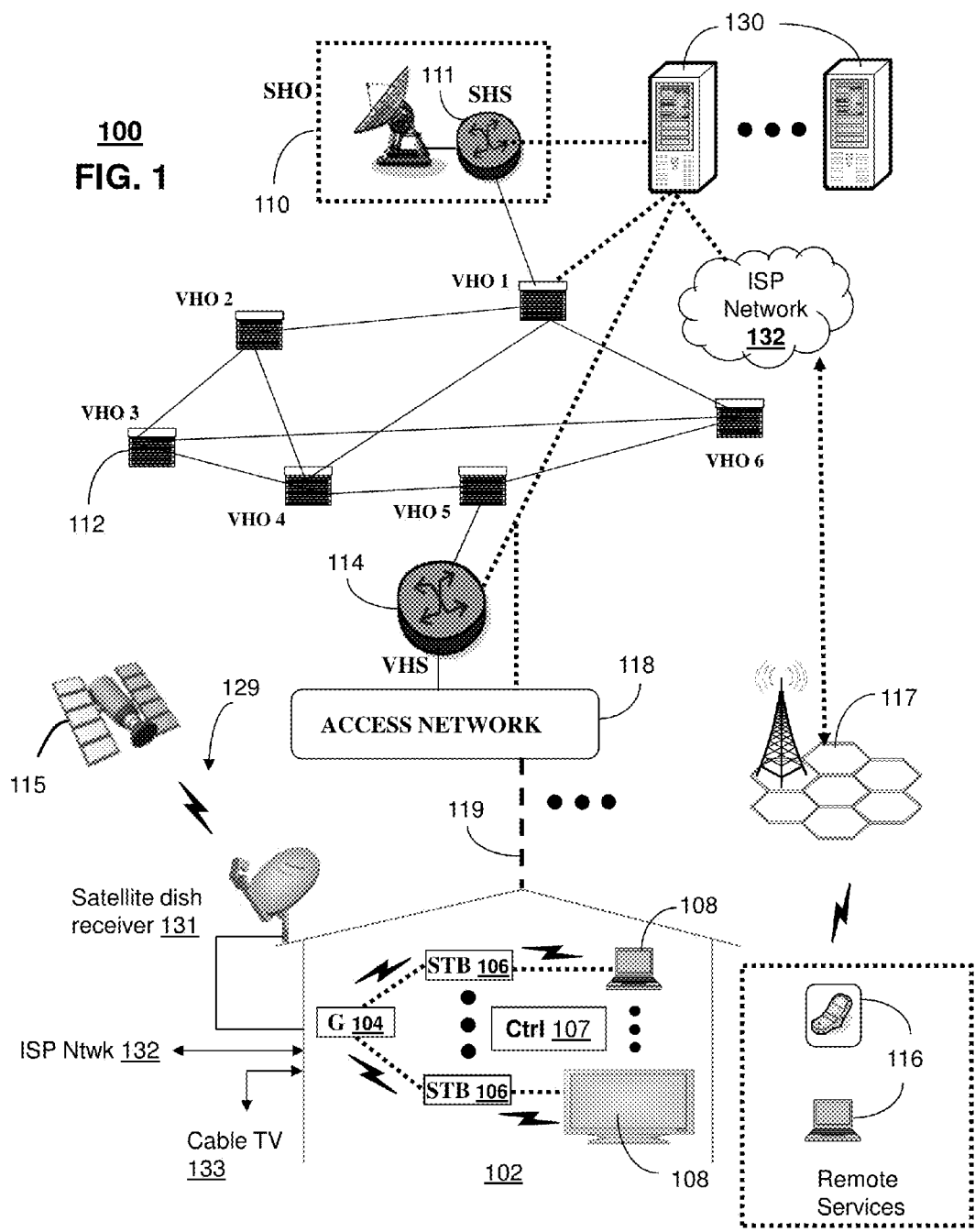
FIGS. 1-2 depict illustrative embodiments of communication systems that provide media services.

The present disclosure describes, among other things, illustrative embodiments of IPTV audio and video calling. Other embodiments are contemplated by the present disclosure.

One embodiment of the present disclosure includes a set-top box (STB) for use in an Internet Protocol Television (IPTV) network comprising a controller to execute a soft-phone client application in the STB where the soft phone application is capable of processing audio or video calls at the STB, and cause the soft-phone to detect an incoming audio call or video call originating from an Internet Protocol Multimedia Subsystem (IMS) network and routed through the IPTV network where the audio call or video call is directed to the STB by a Residential Gateway (RG) having a switching element that selectively routes calls to a plurality of terminal devices including the STB in accordance with a destination address included in a Session Initiation Protocol (SIP) header message. The controller is also operable to cause the soft-phone client application to present a caller identification (ID) through a presentation device coupled to the STB, cause the soft-phone client application to selectively answer the incoming audio call or the video call, receive the incoming audio call or the incoming video call routed from the RG, and present the audio call or video call through the presentation device coupled to the STB One embodiment of the present disclosure includes a non-transitory computer-readable storage medium in a media controller having computer instructions to execute a soft-phone client application on the media processor, receive an audio call or a video call originating from an IP Multimedia Subsystem (IMS) network where the calls are directed to the media processor by a gateway having a switch that routes the audio call or video call in accordance with a destination address included in a Session Initiation Protocol (SIP) header message, and selectively answer one of the audio call or the video call. The computer instructions can be operable to present an audio portion of the audio call or of the video call through a speaker of a presentation device operatively coupled to the media processor.

One embodiment of the present disclosure includes a method at a gateway for receiving a Session Initiation Protocol (SIP) message corresponding to an audio call or a video call, determining from a called number in the SIP message that the audio call or the video call is directed to a Set-Top Box (STB) coupled to the gateway, and receiving at least one of audio calls and video calls destined for the STB. The method at the gateway can also retrieve from the SIP message a calling party number, transmit to the STB a caller identification (ID) associated with the calling party number and cause a digital switch in the gateway to route the audio call or the video call to the STB on the basis of the called number in SIP message and responsive to receiving a signal from the STB indicating that the audio call or video call has been answered by the STB.

FIG. 1 depicts an illustrative embodiment of a first communication system 100 for delivering media content. The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered communication technologies (such as coaxial, powerline or phone line wiring) or can operate over a wireless access protocol such as Wireless Fidelity (WiFi). By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can provide Internet, telephony, and interactive media services also.

It is contemplated that the present disclosure can apply to any present or next generation over-the-air and/or landline media content services system.

Some of the network elements of the IPTV media system can be coupled to one or more computing devices 130, a portion of which can operate as a web server for providing portal services over an Internet Service Provider (ISP) network 132 to wireline media devices 108 or wireless communication devices 116.

All forms of media services can be offered to media devices over landline technologies such as those described above. Additionally, media services can be offered to media devices by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

The gateway 104 in system 100 can be adapted to selectively route calls to any of the communication devices 108 or 116 in building 102 according to a destination address in an incoming message.

Illustrative embodiments of methods that can operate in portions of the devices of FIG. 1 are described below.

Figure 2:
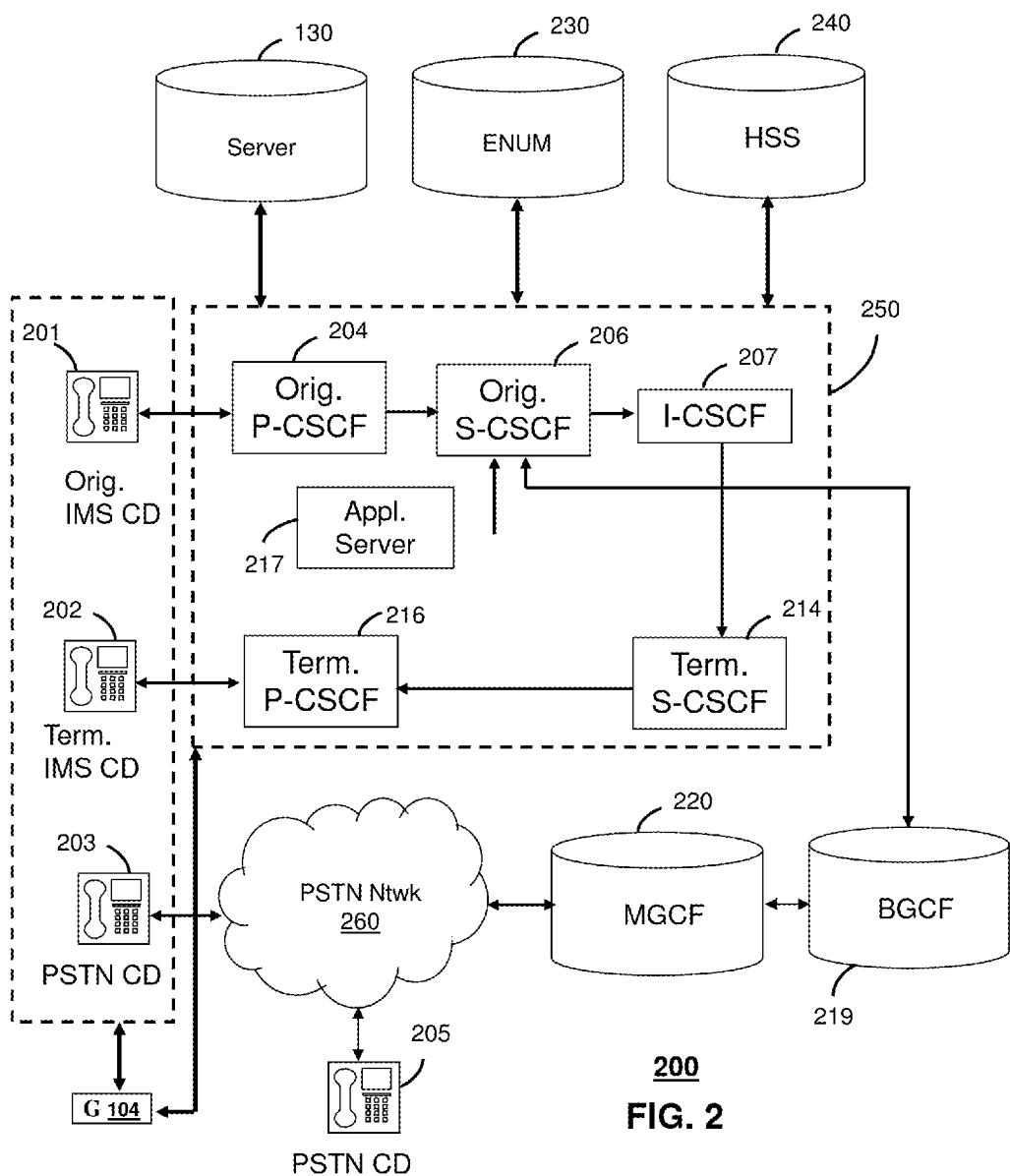

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260. The MGCF 220 is not used when a communication session involves IMS CD to IMS CD communications. Any communication session involving at least one PSTN CD requires the use of the MGCF 220.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to an application server (AS) such as reference 217 that can provide a variety of services to IMS subscribers. For example, the application server 217 can be used to perform originating treatment functions on the calling party number received by the originating S-CSCF 206 in the SIP INVITE message. Originating treatment functions can include determining whether the calling party number has international calling services, and/or is requesting special telephony features (e.g., *72 forward calls, *73 cancel call forwarding, *67 for caller ID blocking, and so on).

Additionally, the originating S-CSCF 206 can submit queries to the ENUM system 230 to translate an E.164 telephone number in the SIP INVITE to a SIP Uniform Resource Identifier (URI) if the terminating communication device is IMS compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260.

The aforementioned communication process is symmetrical. Accordingly, the terms "originating" and "terminating" in FIG. 2 are interchangeable. It is further noted that communication system 200 can be adapted to support video conferencing. In addition, communication system 200 can be adapted to provide the IMS CDs 201 and 202 with the multimedia and Internet services of communication system 100.

System 200 can include or otherwise be coupled with server 130 of FIG. 1 for purposes similar to those described above. It is further contemplated that the communication devices (e.g., references 201, 202, 203, and 205) depicted in FIG. 2 can receive incoming messages that are selectively routed by gateway 104 according to a destination address in a SIP message received from the IMS network 250.

Illustrative embodiments of methods that can operate in portions of the devices of FIG. 2 are described below.

Figure 3:
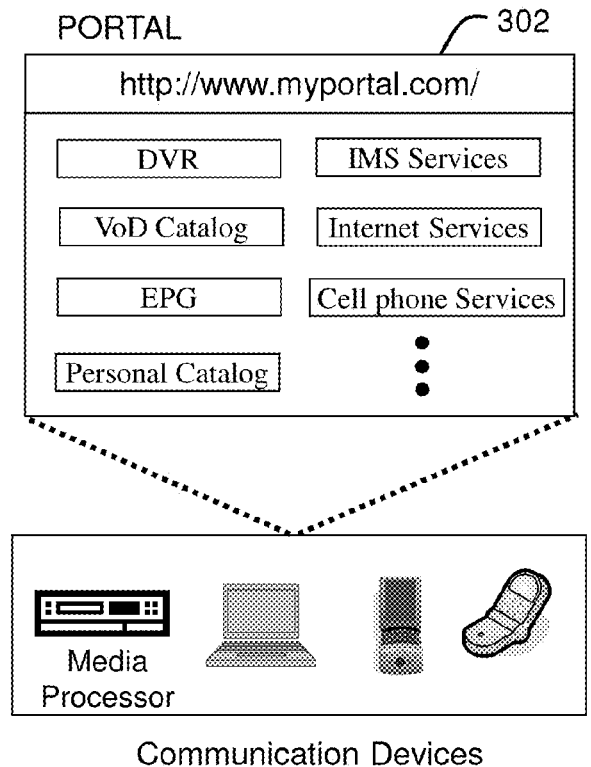
FIG. 3 depicts an illustrative embodiment of a portal interacting with the communication systems of FIGS. 1-2.

FIG. 3 depicts an illustrative embodiment of a portal 302 which can operate from the computing devices 130 of the communication system 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, or a personal catalog (such as personal videos, pictures, audio recordings, etc.) stored in the media processor 106. The portal 302 can also be used for provisioning IMS services described earlier, provisioning Internet services, provisioning cellular phone services, and so on.

It is contemplated by the present disclosure that the web portal 302 can further be utilized to manage and provision a softphone client application operating in the media processor 106 of FIG. 1, and/or a switching element in the gateway 104 of FIGS. 1-2.

Figure 4:
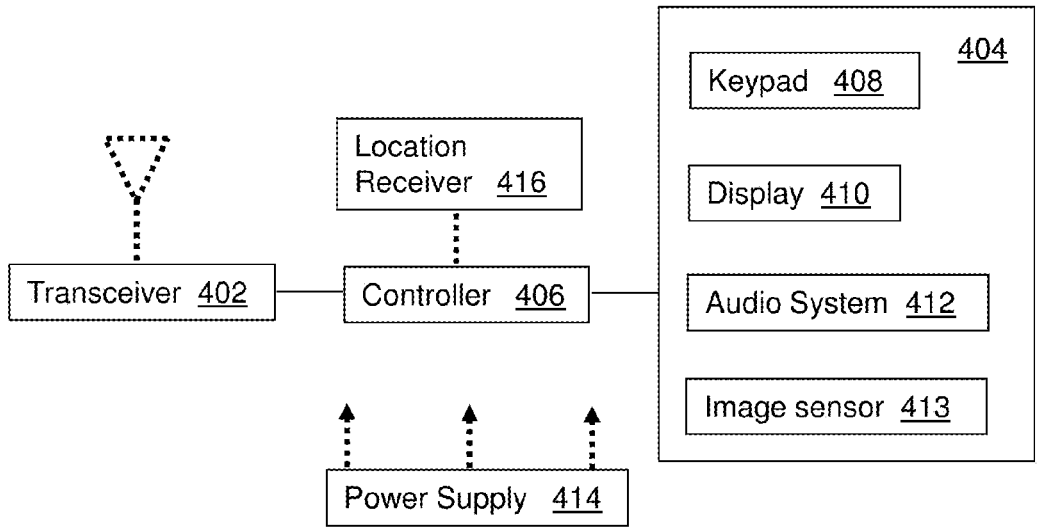
FIG. 4 depicts an illustrative embodiment of a communication device utilized in the communication systems of FIGS. 1-2.

Illustrative embodiments of methods that can operate in portions of the devices of FIG. 3 are described below FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1×, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, WiFi or Bluetooth access point by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

It is further contemplated by the present disclosure that the communication device 400 can perform the functions of a softphone client application operating in the media processor 106 and the gateway 104 of FIG. 1.

Figure 5:
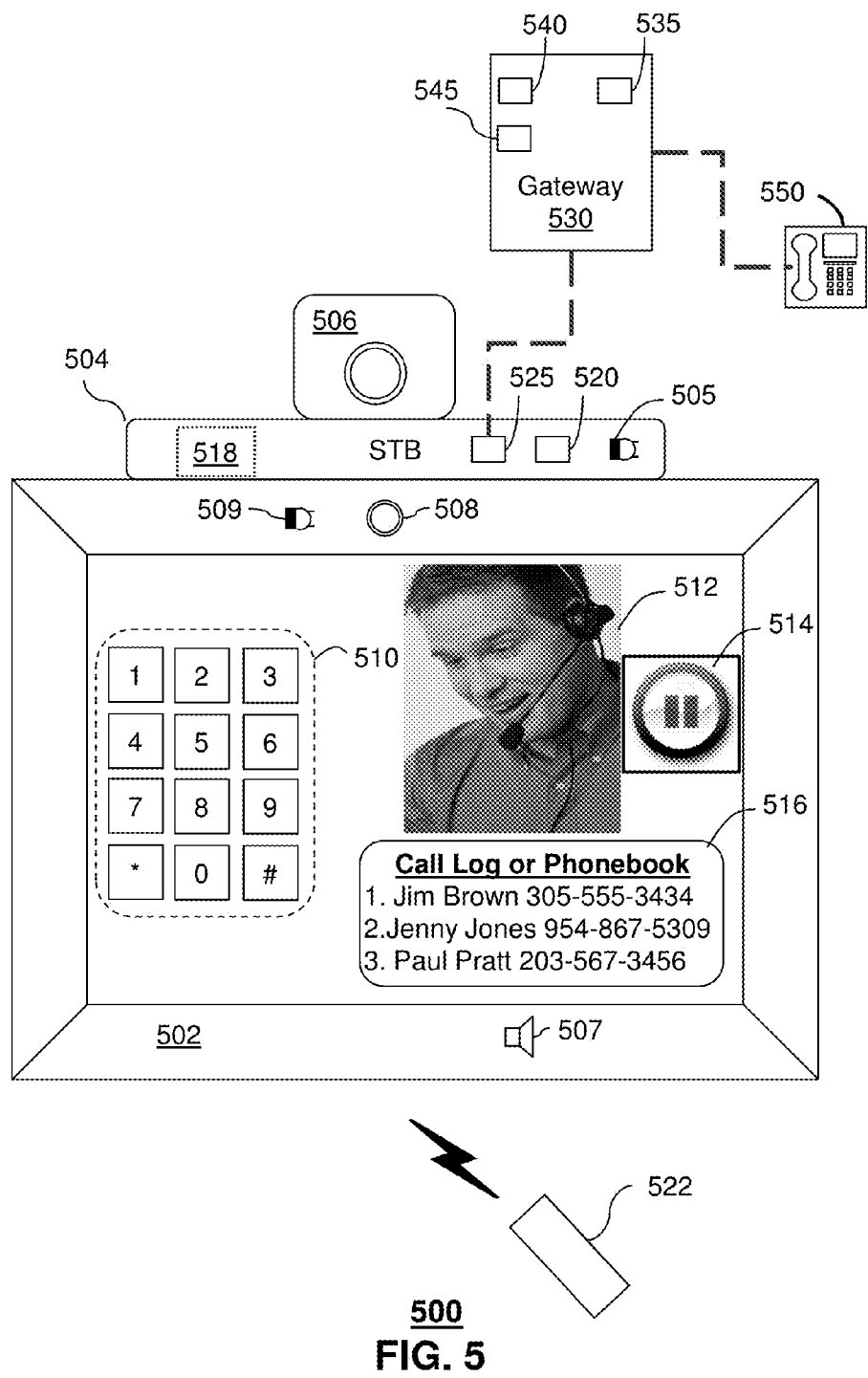
FIG. 5 depicts an illustrative embodiment of a system.

Illustrative embodiments of methods that can operate in portions of the devices of FIG. 4 are described below FIG. 5 depicts a system 500 for use in an IPTV network 100 (such as shown in FIG. 1) in accordance with the claimed embodiments. The system 500 can include an STB 504 having a controller 520 operable to, among other things, execute a soft-phone client application on the STB 504, receive audio calls or video calls at the STB 504 using the soft-phone client application, detect and present a Caller ID associated with an audio call or a video call, and to selectively answer the audio call or the video call. The controller 520 can also be operable to receive the audio call or video call routed from a gateway 530 communicatively coupled to the IPTV network 100 when the audio call or video call is selectively answered and present the audio call or video call through a presentation device 502 coupled to the STB 504. The gateway 530 can include a switching element capable of directing calls to a select communication device in a premise according to a destination address in, for example, a SIP message received by the gateway 530. The switching element 545 can be implemented in software, hardware, or a combination thereof.

The STB 504 can further include a terminal adaptor 525 that is integrated within the STB 504. The terminal adapter 525 can serve the function of converting VoIP signals to Plain Old Telephone Service (POTS) signals commonly used by non-VoIP-capable phones. The gateway 530 which can operate in a residence or commercial establishment can couple to the STB's internal terminal adaptor 525. The gateway 530 can utilize a processor or controller 540 and a terminal adaptor 535 for coupling to other non-VoIP-capable devices within a premise. For VoIP-capable devices, the gateway 530 can directly couple to such devices (see VoIP phone 550) without the terminal adaptor 535. Note that the gateway 530 can couple to any number of terminal devices such as additional STBs, computers, and traditional POTS telephony devices. Depending on whether the terminal device is VoIP-capable, a terminal device may or may not be necessary.

The presentation device 502 can be a television having a speaker 507 that enables an audio call or an audio portion of a video call to be presented through the speaker 507 of the television 502. The STB 504 can include an integrated microphone 505 or a microphone 509 of the television 502 can be operatively coupled to the STB 504 for transmitting audio input from the STB 504 to a calling party telephony device or called party receiving telephony device. The system 500 can also include an IP camera 506 operatively coupled to the STB 504 for transmitting video input from the STB 504 to a calling party telephony device or called party receiving telephony device. Alternatively or optionally, a camera 508 can be integrated as part of the television 502 and operatively coupled to the STB 504.

The STB 504 can also include a digital video recorder (DVR) 518 or have DVR functionality. The controller 520 can perform one or more of the functions among pause, record and mute of a media presentation or media program when a call is answered or for the duration of an STB initiated call. The controller 520 can also facilitate a voice call using the STB 504 by presenting a virtual phone keypad 510 on a display of the presentation device 502 and enable selections of keys using a remote control 522 of the STB 504. The controller 520 can be directed to initiate a voice call or a video call based on a selection made from a call log screen or an electronic phonebook 516. The controller 520 can initiate an audio or video call by using SIP Options messages for service discovery to determine if an endpoint calling device is available to receive the video call.

Figure 6:
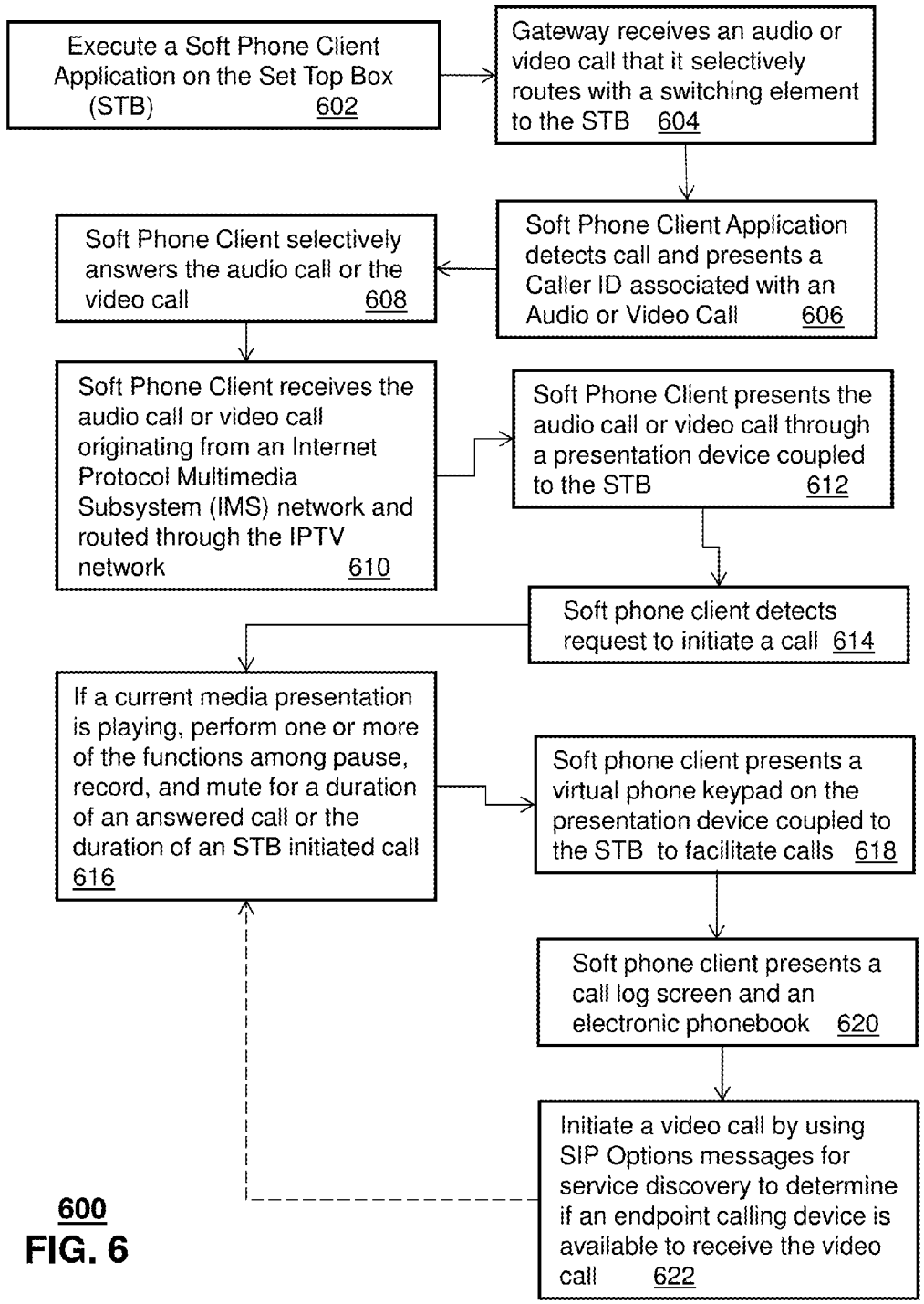
FIG. 6 depicts an illustrative embodiment of a method operating in portions of the systems described in FIGS. 1-5.

The present disclosure contemplates a STB 504 and a gateway 530 (or 104 of FIG. 1) that among other things facilitates audio and video calls via an IPTV network using soft-phone client software in the STB 504 capable of optionally pausing, recording or muting an ongoing media presentation or program according to the illustrative embodiments of method 600 of FIG. 6. By combining DVR functions with the audio and video call functions, a subscriber can conveniently and unobtrusively manage phone and video calls by pausing or muting or allowing background recording of a presentation for the duration of a call.

FIG. 6 depicts an illustrative method 600 that operates in portions of the devices of FIGS. 1-5. Method 600 can begin at 602 in which a soft-phone client application (hereinafter "softphone") is executed on the STB 504. At 604 the STB 504 by way of the softphone can receive audio calls or video calls from the gateway 530. The gateway 530 utilizes the switching element 545 to selectively route a call to the STB 504 by detecting a destination address associated with the STB 504. In one embodiment, the STB 504 can by way of the softphone detect and present a Caller ID associated with the audio call or video call at 606. The softphone can cause the STB 504 to selectively answer the audio call or the video call at 608. The audio call or video call at 610 can be selectively answered by the STB 504 by way of the softphone detecting a user request to accept the call.

The incoming audio call or video call can originate from an IMS network 250 such as shown in FIG. 2 which is routed through an IPTV network 100 such as shown in FIG. 1 such that the audio or video call is directed to the STB 504 by the gateway 530 according to the destination address included in an SIP header message. The gateway 530 can selectively route an incoming call based on caller ID or a P-Asserted-Identity field of the incoming SIP INVITE message, or based on the called number or a Request-URI field of the incoming SIP INVITE message, to multiple recipient devices including a terminal adaptor, the STB 504 and VoIP phones 550 based on stored routing algorithms to cause them to ring.

If multiple phone numbers are utilized in a residence or commercial establishment, the switching element 545 of the gateway 530 can selectively route calls to an appropriate telephony device rather than alert all telephony devices in the premise. With this in mind, the gateway 530 can be operable to access any one or more of a plurality of terminal devices that can include the STB, a secondary STB in a premise, a VoIP phone, a POTS phone, or any other number of telephony devices coupled to the gateway 530.

To accommodate STBs 504 with legacy POTS interfaces, the controller 520 in the STB 504 is operable to cause the softphone to process POTS signals generated by the terminal adapter 525 of the STB 504. Once the audio or video call has been received by the softphone from the gateway 530, the softphone can be adapted to present the call at 612 through a presentation device such as a television 502, which is operably coupled to the STB 504. To avoid interrupting an ongoing media program, the softphone can direct at 616 the DVR 518 to pause the media program which invokes a recording of the media program. Once the softphone detects the call has been terminated, the softphone can initiate replay of the media program from where it was paused. The softphone can initiate step 616 automatically or upon user request.

At 614 the softphone of the STB 504 can detect a request to initiate an audio or video call. For example, the softphone or STB can initiate the video call by initiating a tElephone NUmber Mapping (ENUM) discovery process to determine if a called party is capable of receiving a video call. The STB can include a digital video recorder (DVR) where a controller of the STB is operable to cause the DVR to pause, record, or mute a media presentation responsive to answering the audio or video call, or when a call is initiated by the STB at 616. At 618 the softphone can present a virtual keypad 510 to facilitate the outgoing call. Additionally, the STB 504 at 620 can also facilitate the call by presenting call log screens or phonebooks 516. Thus, a user having a remote controller can scroll through a recent call list, an outgoing or incoming call list or an onscreen phonebook or address book, or dial a number to facilitate calls.

At 622 the softphone can initiate an audio or video call using SIP option messages which are transmitted from the gateway 530 to the IPTV network 100 and routed to the IMS network 250 of FIGS. 1-2. The SIP option message can be used for service discovery to determine if an endpoint device is available to receive the audio or video call. The SIP option message can correspond to an SIP INVITE message that is transmitted to the IMS network 250 that is capable of directing audio or video calls to a terminal device that is IMS complaint or that supports the PSTN protocol. As before, if a current media presentation or program is playing, the softphone at 616 can perform one or more of the functions of directing the DVR 518 to pause, record, and mute for the duration of an initiated call.

Upon reviewing the aforementioned embodiments, it would be evident to an artisan with ordinary skill in the art that said embodiments can be modified, reduced, or enhanced without departing from the scope and spirit of the claims described below. For example, when a caller ID message is displayed on the TV, the user can have option to answer the call or discard the alert message from the TV screen (where a default option can exit the caller ID message in 2 seconds or other predetermined time if the user does not press anything). If the user selects the option to answer the call, then the Gateway 530 will route the call to the STB 504 (executing the soft phone client) and the STB 504 will answer the call (with a SIP 200 OK message sent from the STB 504 to the gateway 530) and the phone will stop ringing as a result of a SIP 180/183 ringing being transmitted to other terminal devices by the IMS network 250.

Also note that the embodiments described herein support voice calls in several ways. In one instance, a pop-up phone keypad can be presented on the screen allowing the user to dial out. In another embodiment, the user can have access to various call logs or phonebooks on-screen and click on the name or phone number of the party to call. In any case, the call will be made via the STB 504 (voice via TV speakers and STB microphone) routed through the gateway 530.

In making a video call from one similarly set up system to another, SIP Options messages for service discovery can be used to determine if another end point is also available and compatible for a video call. This can be determined from components in the IMS core illustrated in FIG. 2. It is further noted that the concepts of the video call can be further extended to allow a subscriber to make a video call from the STB 504 to mobile devices using of a wireless carrier.

Other suitable modifications can be applied to the present disclosure without departing from the scope of the claims below.

Figure 7:
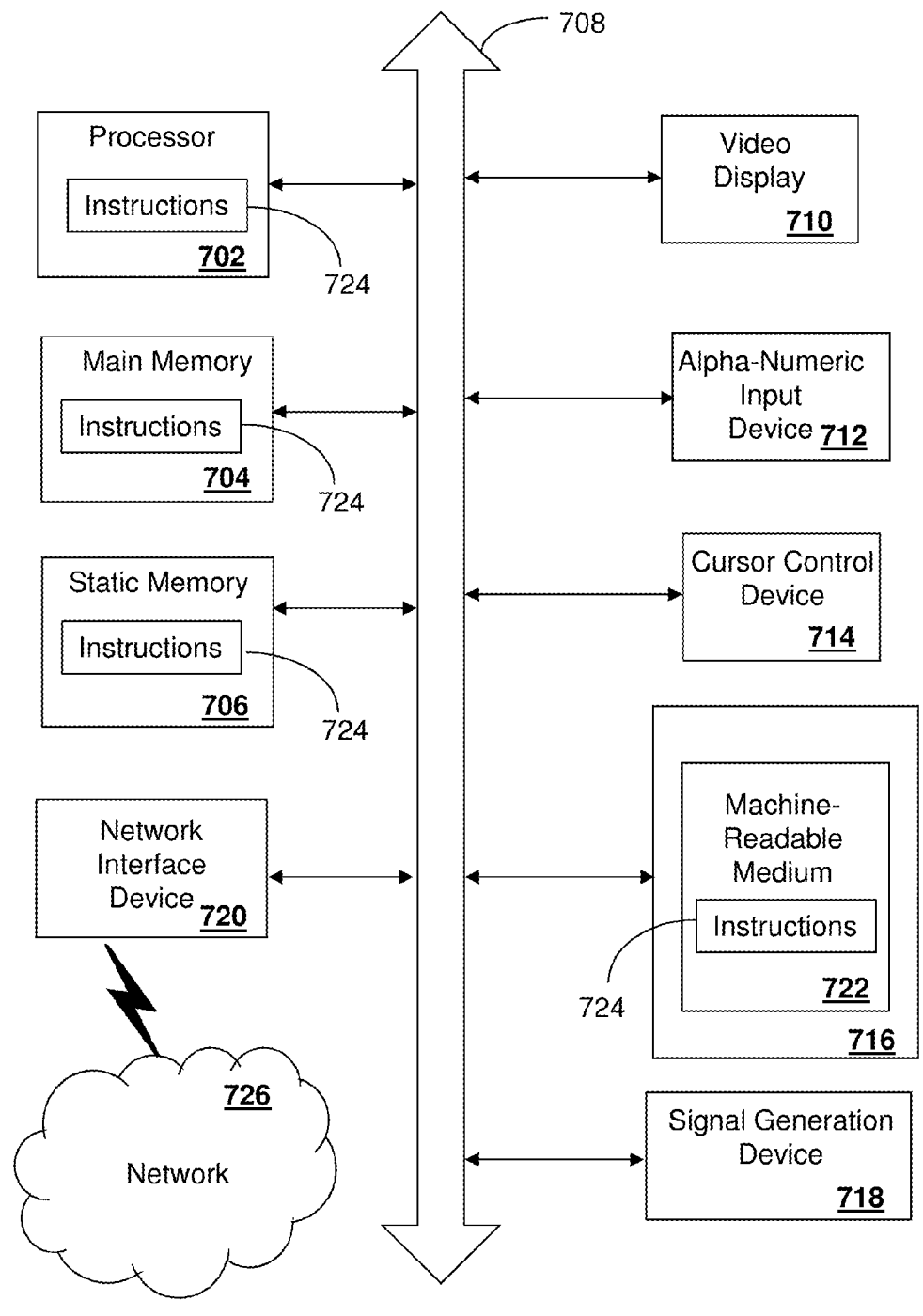
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. The machine can operate, for example, as the STB or media controller 504, the gateway 104 or combinations thereof as described above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; and magneto-optical or optical medium such as a disk or tape. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system comprising:
   a set top box comprising a processing system including a processor; and
   a gateway in communication with the set top box,
   wherein the set top box includes a first terminal adapter,
      wherein the processing system, responsive to executing a soft-phone client, performs operations comprising:
         receiving an incoming call,
         detecting and presenting a caller identifier associated with the call,
         selectively answering the call, and
         initiating an outgoing call to equipment of a party, using a service discovery message to determine capability and availability of the equipment of the party to receive a video call, and
      wherein the first terminal adapter is integrated within the set top box, converts voice over internet protocol signals to plain old telephone service signals, and wherein the processing system causes the soft-phone client to process digital samples of the plain old telephone service signals,
   wherein the gateway includes:
      a switching element directing calls to a select terminal device, wherein the select terminal device is located at a same premises as the set top box, wherein the switching element selectively routes the incoming call based on a caller identification or a P-asserted-identity field of an incoming session initiation protocol header message, and
      a second terminal adaptor coupling to a terminal device that is not voice over internet protocol capable.

2. The system of claim 1, wherein the set top box is in communication with a presentation device, the presentation device comprising:
   a video display presenting the video call and for presenting a virtual keypad to initiate the outgoing call,
   a speaker presenting the call,
   a camera transmitting video input, via the set top box, to a calling party device or a called party device, and
   a microphone transmitting audio input, via the set top box, to the calling party device or the called party device.

3. The system of claim 1, further comprising a plurality of terminal devices coupled to the second terminal adapter, wherein the gateway is coupled to the first terminal adapter.

4. The system of claim 1, wherein the service discovery message comprises a service initiation protocol options message.

5. The system of claim 1, wherein the set top box further includes a memory to store instructions for executing the soft-phone client.

6. The system of claim 1, wherein the switching element at least partially comprises software.

7. The system of claim 1, wherein the session initiation protocol header message comprises a request universal resource indicator field.

8. The system of claim 1, wherein the processing system performs operations further comprising initiating an outgoing video call to a mobile device using a wireless carrier.

9. The system of claim 1, wherein the gateway is located within a premises, and the gateway is communicatively coupled to a plurality of terminal devices within the premises.

10. The system of claim 9, wherein the gateway selectively routes the incoming call among the plurality of terminal devices based on stored routing algorithms.

11. A method comprising:
   detecting, by a set top box comprising a processing system including a processor, a request to initiate a video call to a recipient device;
   responsive to detecting the request, causing, by the set top box, transmission of a service discovery message to determine capability of the recipient device to receive the video call,
      wherein the set top box includes an integrated terminal adapter converting voice over internet protocol signals to plain old telephone service signals and the processing system executing a soft-phone client, wherein the processing system causes the soft-phone client to process digital samples of the plain old telephone service signals, wherein the service discovery message is transmitted from a gateway in communication with the set top box, wherein the gateway includes a switching element directing incoming calls to a terminal device, wherein the terminal device is located at a same premises as the set top box, wherein the switching element selectively routes the incoming calls based on a caller identification or a P-asserted identity field of an incoming session initiation protocol header message;

causing, by the set top box, a digital video recorder to pause, record or mute a media presentation being presented at a presentation device;

causing, by the set top box, the presentation device to present a virtual keypad, a call log, a phone book or an address book to facilitate the video call; and directing, by the set top box, the video call to the recipient device.

12. The method of claim 11, wherein the gateway is coupled to an access network providing a connection to the recipient device, and wherein the service discovery message is used to determine availability of equipment of a party associated with the recipient device to receive the video call.

13. The method of claim 12, wherein the service discovery message comprises a service initiation protocol options message.

14. The method of claim 11, wherein the service discovery message is transmitted utilizing a telephone number mapping process.

15. The method of claim 14, wherein the telephone number mapping process is performed at a server of an internet protocol multimedia subsystem network communicatively coupled to the set top box.

16. A non-transitory computer-readable storage device, comprising instructions which, responsive to being executed by a processing system including a processor of a set top box, cause the processing system to perform operations comprising:

detecting a request to initiate a video call to a recipient device;

responsive to detecting the request, causing transmission of a service discovery message to determine a capability of the recipient device and an availability of equipment of a party associated with the recipient device to receive the video call, wherein the service discovery message is transmitted from a gateway in communication with the set top box, wherein the gateway includes a switching element directing incoming calls to a terminal device, wherein the terminal device is located at a same premises as the set top box, wherein the switching element selectively routes the incoming calls based on a caller identification or a P-asserted-identity field of an incoming session initiation protocol header message;

causing a digital video recorder to adjust a media presentation at a presentation device to facilitate the video call resulting in adjusting of the media presentation; and directing the video call to the recipient device, wherein the set top box includes an integrated terminal adapter converting voice over internet protocol signals to plain old telephone service signals, wherein the instructions comprise a soft-phone client, and wherein the processing system causes the soft-phone client to process digital samples of the plain old telephone service signals.

17. The non-transitory computer-readable storage device of claim 16, wherein the operations further comprise causing the presentation device to present a virtual keypad, a call log, a phone book or an address book to facilitate the video call, wherein the adjusting of the media presentation comprises pausing, recording, muting, or a combination thereof, wherein the directing of the video call is via the gateway, wherein the gateway is coupled to an access network providing a connection to the recipient device.

18. The non-transitory computer-readable storage device of claim 16, wherein the recipient device comprises a mobile device, wherein the gateway is located within a premises, wherein the mobile device is outside the premises, and wherein the service discovery message is transmitted via a wireless network.

19. The non-transitory computer-readable storage device of claim 16, wherein the service discovery message comprises a service initiation protocol options message.

20. The non-transitory computer-readable storage device of claim 16, wherein the service discovery message is transmitted utilizing a telephone number mapping process.

* * * * *